United States Patent
Bonnardel et al.

(10) Patent No.: US 10,058,836 B2
(45) Date of Patent: Aug. 28, 2018

(54) PROCESS FOR PRODUCING AEROGELS BY DIELECTRIC HEATING

(71) Applicant: ENERSENS, Longjumeau (FR)

(72) Inventors: Pierre-Antoine Bonnardel, Gif S/Yvette (FR); Sophie Chausson, Villeurbanne (FR)

(73) Assignee: ENERSENS, Longjumeau (FR)

( * ) Notice: Subject to any disclaimer, the term of this patent is extended or adjusted under 35 U.S.C. 154(b) by 50 days.

(21) Appl. No.: 15/123,963

(22) PCT Filed: Mar. 9, 2015

(86) PCT No.: PCT/EP2015/054859
§ 371 (c)(1),
(2) Date: Sep. 6, 2016

(87) PCT Pub. No.: WO2015/132418
PCT Pub. Date: Sep. 11, 2015

(65) Prior Publication Data
US 2017/0014792 A1    Jan. 19, 2017

(30) Foreign Application Priority Data
Mar. 7, 2014 (FR) ...................................... 14 51910

(51) Int. Cl.
 *B01J 13/00* (2006.01)
 *C01B 33/158* (2006.01)
(52) U.S. Cl.
 CPC ....... *B01J 13/0091* (2013.01); *C01B 33/1585* (2013.01)
(58) Field of Classification Search
 CPC .......................... B01J 13/0091; C01B 33/1585
 See application file for complete search history.

(56) References Cited

U.S. PATENT DOCUMENTS 5,409,683 A  *  4/1995  Tillotson ............. B01J 13/0091
                                                     423/338
5,705,535 A      1/1998  Jansen et al.
(Continued)

FOREIGN PATENT DOCUMENTS

CN    201793378 U    4/2011
FR      2873677 A1   2/2006
(Continued)

OTHER PUBLICATIONS

Ashley et at., Preface, Journal of Non-Crystalline Solids, vol. 285, 2001, p. vii-viii.
(Continued)

*Primary Examiner* — Michael A Salvitti
(74) *Attorney, Agent, or Firm* — Birch, Stewart, Kolasch & Birch, LLP (57) ABSTRACT

The present invention relates to a process for producing aerogels, comprising the following successive steps: a) formation or casting of a sol in a reactor, optionally in the presence of a reinforcing material and/or an additive, b) complete gelling of the sol into a lyogel; c) optionally hydrophobization of the lyogel resulting in a hydrophobized lyogel; d) drying of the optionally hydrophobized lyogel so as to obtain an aerogel; said process being characterized in that the complete gelling step b) comprises dielectric heating by microwave or high-frequency electromagnetic irradiation, inducing an increase in temperature so as to reach a set temperature for complete gelling $T_b$ in a range of from 100° C. to 200° C., preferably from 100° C. to 150° C., the temperature $T_b$ being maintained in this range for a period of time U sufficient to attain complete gelling of the lyogel, and more particularly the end of syneresis of the lyogel.

19 Claims, 1 Drawing Sheet

(56) References Cited

U.S. PATENT DOCUMENTS

| | | | |
|---|---|---|---|
| 5,789,075 A * | 8/1998 | Frank | B01J 13/0091 252/62 |
| 5,811,031 A | 9/1998 | Jansen et al. | |
| 6,887,563 B2 | 5/2005 | Frank et al. | |
| 2004/0087670 A1 | 5/2004 | Lee et al. | |
| 2012/0112388 A1* | 5/2012 | Kim | C01B 33/159 264/419 |
| 2014/0252263 A1* | 9/2014 | Besselievre | C04B 28/005 252/62 |
| 2014/0319418 A1* | 10/2014 | Cai | B01J 13/0091 252/182.32 |
| 2016/0115685 A1* | 4/2016 | Bonnardel | C04B 38/0058 428/220 |
| 2017/0014792 A1* | 1/2017 | Bonnardel | B01J 13/0091 |

FOREIGN PATENT DOCUMENTS

| | | |
|---|---|---|
| WO | WO 96/20822 A1 | 7/1996 |
| WO | WO 2012/147002 A1 | 11/2012 |
| WO | WO 2013/053951 A1 | 4/2013 |

OTHER PUBLICATIONS

International Search Report (Form PCT/ISA/210), dated Jun. 22, 2015, for International Application No. PCT/EP2015/054859.
Menéndez et al., "A rnicrowave-based method for the synthesis of carbon xerogel spheres," vol. 50, No. 10, Mar. 21, 2012, pp. 3555-3560.

* cited by examiner

PROCESS FOR PRODUCING AEROGELS BY DIELECTRIC HEATING

The present invention concerns the field of aerogel insulating materials, and more particularly the manufacturing process thereof.

Energy savings, and more particularly thermal insulation, is currently a core industrial and building issue.

Thermal insulation is traditionally obtained by the use of glass wool, rock wool, expanded polystyrene or extruded polystyrene, often combined in industrial insulation systems on the one hand, and for building, on the other hand. The thermal insulation performance of materials is measured by their thermal conductivity. The lower the thermal conductivity value, the less heat the material conducts and the better the thermal insulation.

It is in this context that insulation materials based on aerogels and xerogels was developed. Both aerogels and xerogels are very interesting, not only for their thermal and acoustic insulating properties, but also for their low density. They can be obtained in the granular or monolithic form. They can also be in the form of composite materials reinforced by materials such as foams or fibrous materials.

Aerogels and xerogels can be described as a particular type of gels. A gel has a continuous porous three-dimensional structure. Gels are distinguished according to the nature of the fluid present in its pores, aerogels and xerogels (air), hydrogels (water) or organogels (organic solvent), in particular alcogels (alcohol). All of the terms hydrogel, alcogel and organogel are included under the more general designation of lyogels. Aerogels and xerogels are generally obtained by drying a lyogel.

Traditionally, the term aerogel generally refers to a gel dried under supercritical conditions, i.e., the major solvent is in the supercritical fluid state under these drying conditions, while the term xerogel refers to a gel dried under subcritical conditions, i.e., the major solvent is not in the supercritical fluid state under these conditions. However, in the following, the term "aerogel" will encompass both aerogels and xerogels for simplification purposes.

Traditionally, the preparation of a gel involves a sol-gel transition step, i.e. the passage from a sol—suspension of solid particles in a solvent—to a gelatinous material with a three-dimensional structure of a solid-appearing network, the gel. Aerogels are thus generally obtained using manufacturing processes comprising the following steps:
1) formation of a sol, notably by hydrolysis and condensation of precursors in a solvent;
2) jellification, followed by
3) aging, these two steps leading to the formation of a lyogel;
4) optionally hydrophobization leading to a hydrophobic lyogel;
5) drying (subcritical or supercritical), leading to the aerogel.

Aging step 3) is reflected by physicochemical changes that occur after jellification. When the gel ages, the cross-linking phenomenon leads to shrinkage of the material with expulsion of the solvent: this is called "syneresis". Aging allows improving the mechanical properties of the gel under the effect of syneresis mechanisms (separation of liquid and gel). Now, this step generally lasts several hours. Notably, in the case of a silica alcogel in which the solvent is ethanol, the duration of aging in refluxing ethanol at atmospheric pressure is around 3 hours. This duration is necessary for the aerogel obtained at the end of the process to offer the desired mechanical and thermal performances.

Such a preparation process is illustrated, for example, in application FR 2 873 677 (manufacture of granules) or WO 2013/053951 (manufacture of granules or self-supporting panels).

Thus, a traditional manufacturing process leads to a lyogel (optionally made hydrophobic) in a minimum of 8 hours, to which time the drying time should be added. If the time for obtaining the lyogel is shorter, the time of the aging step in particular will be insufficient to obtain an aerogel with satisfactory mechanical and thermal performances.

There is therefore a need for reducing the overall production time of aerogels. Several solutions have been proposed in the prior art.

For example, American patent application US 2004/0087670 describes a process for rapid production of aerogels. The aerogels are produced using a fast solvent exchange within the gels by injecting $CO_2$ under supercritical conditions, rather than a liquid, in an extractor that has been preheated and pre-pressurized. High-frequency pressure waves are applied to improve the solvent exchange. The process permits significantly reducing the time to form aerogels.

Moreover, American patent application US 2012/0112388 describes a process and apparatus for the preparation of a hydrophobic aerogel, seeking to reduce the time devoted to the hydrophobization of the gel, using ultrasonic waves. The process consists of directly inserting a panel with a mesh structure into a reactor, injecting the wet gel into the panel, installing an ultrasound generator in a lower part of the reactor in order to emit ultrasonic waves inside the reactor, and feeding with nitrogen, from the lower part, inside the reactor to promote a reaction and thus transform the wet gel into a hydrophobic aerogel in a short time. The reaction time (aging) described in Examples 1 and 2 (page 3, paragraph 50 and page 4 paragraph 53) is 6 h, however.

Moreover, American patents U.S. Pat. Nos. 5,811,031 and 5,705,535 relate to a process for preparing aerogels by subcritical drying of inorganic and organic hydrogels and lyogels prepared from silicon compounds. The drying is a dielectric drying such as drying with microwaves or high-frequency drying. The production of the "wet" aerogel is done according to a conventional sol-gel process; the gel formation and aging steps are conducted at 85° C. for 7 days.

Finally, Chinese utility model CN 201793378 describes a process for preparing aerogels involving microwave irradiation comprising the following steps:
1) preparation of the silicon dioxide sol;
2) preparation of the wet gel; and
3) aging of the stock solution and drying under normal pressure.

The preparation of the silicon dioxide sol comprises mixing an organosilane, an organic solvent, water and an acid catalyst. The mixture is then irradiated with microwaves in order to conduct the polymerization reaction. The use of microwave irradiation is therefore limited to the sol formation step, since the use of these microwaves only seeks to obtain a large number of microscopic bubbles leading to a porous and strong gel. Therefore, the prior art does not provide a solution to reduce the time devoted to the lyogel aging step, which is however a critical step in determining the overall duration of the aerogel production cycle.

Surprisingly, the applicant has discovered that dielectric heating, by microwave or high-frequency electromagnetic irradiation, allows considerably reducing the necessary time for the aging step of the gel, while preserving satisfactory mechanical and insulating properties for the production of aerogels, both in the form of granules and composite materials, for example of the monolithic type.

One aspect of the present invention therefore concerns an aerogel manufacturing process comprising the following successive steps:

a) forming or pouring a sol into a reactor, optionally in the presence of a reinforcing material and/or an additive;

b) complete jelling of the sol into a lyogel;

c) optionally hydrophobing the lyogel leading to a hydrophobic lyogel;

d) drying the optionally hydrophobic lyogel to obtain an aerogel;

said process being characterized in that complete jellification step b) comprises dielectric heating inducing an increase in temperature to reach a complete jellification setpoint temperature $T_b$ in a range from 100° C. to 200° C., preferably from 100° C. to 150° C., temperature $T_b$ being maintained in this range for a time $t_1$ sufficient to reach the end of complete jellification of the lyogel, and more particularly completion of syneresis of the lyogel.

DEFINITIONS

"Dielectric heating" means, in the sense of the present invention, heating by application of electromagnetic waves. The present invention concerns two frequency ranges:

high frequency (HF) radiation whose usual frequency is situated between 1 and 400 MHz, corresponding to wavelengths ranging from 300 to 0.75 m; and microwave (MW) radiation whose frequencies vary between 400 and 18,000 MHz, corresponding to wavelengths ranging from 75 to 1.6 m.

In the present invention, therefore, it will be referred to heating by microwave or high-frequency irradiation according to the frequency range chosen.

Heating by HF and MW is based on the same principle. Electromagnetic energy is dissipated within the mass of the product, as a function of the electrical field distribution and the dielectric moments of the reactants (solvent, sol and/or lyogel) in the reactor. This type of energy transfer is very effective, since we know how to produce very intense electrical field distributions, generating high power densities (for example up to 5 kW/L of product).

In the sense of the present invention, the "setpoint temperature" of a step of the process is understood as the target temperature of this step in the reaction medium, i.e., in the lyogel in steps b) and c) of the process according to the invention, or in the sol of step a). Thus, if the initial temperature of the reaction medium is different from the setpoint temperature, there is a period of time during which the system temperature is changed (for example by heating) so as to reach the setpoint temperature. The setpoint temperature can be either constant or modulated during said step of the process.

"Sol" means, in the sense of the present invention, a mixture of precursors, a solvent and, optionally, a jellification catalyst, leading, after the jellification reaction and aging, to the lyogel.

All of the terms hydrogels, alcogels and organogels are included under the more general designation of lyogels in the present invention.

In the sense of the present invention, the term "aerogel" will encompass both aerogels and xerogels for simplification purposes.

The reaction that leads to jellification does not stop at the gel point; it continues. Indeed, hydrolysis and condensation reactions continue during aging, which increases the connectivity of the gel structure. All of this process of gel development over time is called "aging". Aging of the gel is reflected by physicochemical changes which occur after jellification, which can be distinguished as follows:

polymerization (reinforcement step via the formation of new bonds, or crosslinking, notably by condensation, for example, due to Brownian motion and the flexibility of the network);

curing (process of dissolution and reprecipitation), which is basically observed in the case of an inorganic lyogel; and phase transformation or syneresis due to shrinkage of the material with expulsion of the solvent.

Thus, "syneresis" is understood, in the sense of the present invention, as shrinkage of the lyogel resulting from crosslinking or condensation reactions that lead to expulsion of solvent (interstitial liquid) out of the lyogel. Syneresis therefore generates densification of the solid network of the gel. Thus, the distribution of pore sizes, the specific surface and the permeability of the gel are changed. Moreover, the mechanical and thermal properties of the gel are improved.

In the sense of the present invention, the "complete jellification step" comprises both the jellification step in the strict sense, i.e., the sol-gel transition leading to the gel, and the aging step. In fact, given the very short reaction time of the process according to the present invention, it is difficult to distinguish the two steps.

In the sense of the present invention, "absolute pressure" is understood as the pressure measured relative to vacuum (absolute zero pressure).

"Composite aerogel" means, in the sense of the present invention, an aerogel comprising at least two immiscible compounds intimately bound to each other. The composite aerogel then has properties, particularly physical properties (for example thermal conductivity, rigidity, etc.) that each of the materials taken separately does not necessarily have.

Composite aerogels according to the present invention comprise a "reinforcement material", which is either fibrous or a foam.

In the sense of the present invention, a "fibrous reinforcement material" comprises fibers or a fibrous nonwoven web, or mixtures thereof. The person skilled in the art will know how to choose from among the various fiber types those that are the most suitable to production of thermal insulation, for example glass fibers, mineral fibers, polyester fibers, aramid fibers, nylon fibers and vegetable fibers, or a mixture thereof. For the choice of these fibers, the skilled person can refer to U.S. Pat. No. 6,887,563. "Fibrous nonwoven web" means, in the sense of the present invention, a three-dimensional web made up of overlapping structured but nonwoven fibers. Indeed, when the fibers are woven, the thermal conductivity of the fibrous web increases and the performances of the composite aerogels obtained are reduced.

"Foam" means, in the sense of the present invention, a substance, notably a polymer, imprisoning gas bubbles within it. Foams are distinguished into "closed-cell foams", i.e., the gas pockets are completely coated with the solid material, as opposed to "open-cell foams" in which the gas pockets communicate with each other. For example, mention may be made of melamine open-cell foams such as foams comprising a polymer in which one of the monomers is melamine, and notably melamine-formaldehyde foams, resulting from a polymerization reaction between melamine and formaldehyde. For example, foams sold under the name BASOTECT® are open-cell melamine foams. Mention may be made of open-cell polyurethane foams, which are notably used for acoustic insulation.

"Monolithic" means in the sense of the present invention that the aerogel, notably composite, is solid and in the form of an integral block, notably in the form of a panel. A monolithic aerogel can be either rigid or flexible. "Rigid" means that the material cannot be deformed significantly without observing the formation of cracks or even breakage of the monolithic material. Notably, this means that the monolithic material cannot be rolled. "Flexible", on the contrary, means that the material can be deformed and, notably, rolled. To qualify the monolithic material, the term "self-supporting" can also be used, which will be understood as meaning that the stability of the product is not due to an external support. A monolithic aerogel can be either rigid or flexible.

In contrast, an aerogel that is not monolithic will be obtained in the form of granules. In the present invention, the thermal conductivity of the aerogel is measured according to the guarded hot plate method of standard NF EN 12667 at 20° C. and at atmospheric pressure of July 2001.

DESCRIPTION OF THE FIGURE

The abscissa represents the time in minutes, the ordinate (left) represents the temperature in ° C., and the other ordinate (right) represents both absolute pressure (in bars) and the incident power density (in kW/L).

The squares represent pressure and the diamonds represent temperature. The power density is represented in the form of a histogram.

DETAILED DESCRIPTION OF THE INVENTION

The present invention concerns an aerogel manufacturing process comprising the following successive steps:

a) forming or pouring a sol into a reactor, optionally in the presence of a reinforcing material and/or an additive, b) complete jelling of the sol into a lyogel;

c) optionally hydrophobing the lyogel leading to a hydrophobic lyogel;

d) drying the optionally hydrophobic lyogel to obtain an aerogel;

said process being characterized in that complete jellification step b) comprises dielectric heating by microwave or high-frequency electromagnetic irradiation inducing an increase in temperature to reach a complete jellification setpoint temperature $T_b$ in a range from 100° C. to 200° C., preferably from 100° C. to 150° C., temperature $T_b$ being maintained in this range for a time $t_1$ sufficient to reach the end of complete jellification of the lyogel, and more particularly completion of syneresis of the lyogel.

The process according to the invention thus allows to reduce very notably the time devoted to the aging step, to the point that it becomes difficult to distinguish this step from the jellification step as such.

Moreover, the process according to the present invention is reproducible and reliable, the products obtained are of consistent quality and similar to that of products obtained according to a traditional manufacturing process involving longer reaction times. Advantageously, no binder is used or added at any step of the process according to the invention. Step a)

The sol comprises precursors and a solvent. This solvent can be organic or aqueous. In one preferred embodiment, the solvent is an alcohol, preferably ethanol. In another embodiment, the solvent is water.

The sol used in step a) is organic, inorganic or hybrid.

When the sol is organic, it advantageously comprises precursors of resorcinol formaldehyde, phenol formaldehyde, melamine formaldehyde, cresol formaldehyde, furfuryl alcohol phenol, polyacrylamides, polyacrylonitriles, polycyanurates, polyfurfuryl alcohol, polyimides, polystyrenes, polyurethanes, polyvinyl alcohol dialdehyde, epoxy, agar, and agarose.

Advantageously, the sol of step a) is an inorganic sol. Preferably, the inorganic sol is selected from silica, titanium oxide, manganese oxide, calcium oxide, calcium carbonate, or zirconium oxide sols, and mixtures thereof, more preferably from the group of silica, titanium oxide, manganese oxide, calcium oxide or calcium carbonate sols and mixtures thereof, even more preferably it is a silica sol.

For example, a silica sol can comprise an polyalcoxydisiloxane (notably a polyethoxysiloxane) as a precursor and ethanol as a solvent, in mixture with aqueous hydrochloric acid.

In one particular embodiment, step a) comprises forming the sol in the reactor.

In a second embodiment, the sol is formed beforehand outside the reactor in which step b) is conducted, and step a) comprises or consists of pouring the sol in the reactor, optionally in the presence of a reinforcing material and/or additive.

Advantageously, the additive seeks to improve the material cost structure, and more specifically the mechanical properties, cohesion or thermal conductivity of the aerogels according to the invention. Preferably, this additive comprises an opacifier. Thus, advantageously, the material according to the invention also comprises an opacifier. The use of an opacifier allows reducing the thermal conductivity value by reducing its radiative component. Typically, the opacifier is chosen from among SiC, $TiO_2$, carbon black, graphite, $ZrO_2$, ZnO, $SnO_2$, MnO, NiO, TiC, WC, $ZrSiO_4$, $Fe_2O_3$, $Fe_3O_4$, $FeTiO_3$ or mixtures thereof. In particular, the opacifier is chosen in the group consisting of SiC and $TiO_2$ and their mixtures.

In one particular embodiment of the invention, a fibrous reinforcement material is placed in the reactor where the sol was poured during step a).

The fibrous reinforcement material permits structuring the aerogel to improve its mechanical strength and resistance while keeping its thermal insulation properties.

Preferably, the fibrous reinforcement material comprises a fibrous nonwoven web, advantageously chosen from among organic webs, inorganic webs, natural fiber webs, mixed webs and laminated mixed webs. In this embodiment, the aerogel obtained according to the process of the invention is a monolithic composite aerogel. According to a first embodiment, the web is organic and chosen from among organic polyethylene terephthalate (PET) webs. According to a second embodiment, the web is inorganic and chosen from among inorganic glass wool or rock wool webs.

In another particular embodiment, a foam reinforcement material is placed in the reactor where the sol is poured during step a). In this case also, the aerogel obtained according to the process of the invention is a monolithic composite aerogel. Preferably, it is an open-cell foam, typically an open-cell melamine or polyurethane foam. For example, foams sold under the name BASOTECT® are open-cell melamine foams.

Step b)

The dielectric heating of step b) can be applied either by microwave irradiation or by high-frequency irradiation. Advantageously the frequency of the electromagnetic field applied is comprised between 3 MHz and 3000 MHz, still more advantageously between 3 and 2500 MHz.

In the case of microwave irradiation, the frequency range of the electromagnetic field applied is advantageously comprised between 400 and 2500 MHz.

In the case of high-frequency irradiation, the frequency range of the electromagnetic field applied is advantageously comprised between 10 and 400 MHz.

Preferably, the setpoint temperature range for complete jellification is comprised between 100° C. and 180° C., more preferably between 100° C. and 150° C., and most preferably between 110° C. and 130° C. For example, the complete jellification setpoint temperature of step b) is comprised in a range from 120° C. to 130° C.

In one particular embodiment, the setpoint temperature for complete jellification is constant during step b). In another embodiment, the setpoint temperature for complete jellification is modulated during step b).

Preferably, the setpoint temperature for complete jellification is greater than the boiling point of the solvent. Advantageously, the absolute pressure in the reactor at step b) is greater than atmospheric pressure. Preferably, step b) is therefore done under pressure. For example, the absolute pressure in the reaction medium of step b) is comprised between 1 and 20 bars, more preferably, it is comprised between 1 and 15 bars, and even more preferably it is comprised between 1.5 and 12 bars.

The time $t_1$ sufficient to attain completion of syneresis of the lyogel is determined according to criteria well-known to the skilled person. For example, this time can be measured by quantifying the solvent expelled from the gel during this step: syneresis is finished when solvent expulsion is no longer observed. In practice, the process is pursued (that is, one proceeds to step d) optionally preceded by step c)) until the final aerogel is obtained, and the thermal properties of the aerogel obtained are measured. If these are satisfactory, i.e., thermal conductivity λ of the final aerogel is notably less than 25 mW/m.K, preferably less than 21 mW/m.K, and in the case of monolithic composite aerogels comprised between 10 and 15 mW/m.K, time $t_1$ is sufficient. If they are not (for example thermal conductivity λ of the final aerogel greater than 25 mW/m.K, preferably greater than 21 mW/m.K, and in the case of monolithic composite aerogels greater than 15 mW/m.K), time $t_1$ is insufficient.

Moreover, the apparent density of the aerogel obtained can also be measured. If this is satisfactory (e.g. apparent density less than or equal to 150 kg/m$^3$, in particular between 40 and 150 kg/m$^3$; in the case of aerogels obtained as monolithic aerogels, the aerogel preferably has an apparent density between 70 and 150 kg/m$^3$; in the case of aerogels obtained as granules, the aerogel preferably has an apparent density between 40 and 90 kg/m$^3$), time $t_1$ is sufficient. If they are not (for example, apparent density greater than or equal to 150 kg/m$^3$ in the case of a monolithic aerogel; or greater than or equal to 90 kg/m$^3$ in the case of a granular aerogel), time $t_1$ is insufficient.

The mechanical properties of the aerogel obtained can also be measured. If they are satisfactory (for example the Young's modulus of the aerogel is comprised between 0.6 and 2 MPa), time $t_1$ is sufficient. If they are not (for example Young's modulus below 0.6 MPa), time $t_1$ is insufficient.

Preferably, time $t_1$ is at least 6 minutes. It is observed experimentally that this time $t_1$ is advantageously less than or equal to 1 hour, still more advantageously less than or equal to 30 minutes, still more advantageously less than or equal to 15 minutes, still more advantageously less than or equal to 10 minutes.

The heating time for reaching temperature $T_b$ depends on the quantity of sol in the reactor and the power provided by the generator. Thus, this heating time is directly linked to the power density applied to the material (sol or lyogel). Preferably, this time is as short as possible, and if possible less than the time sufficient to obtain the complete jellification of the sol into lyogel in step b). For example, this heating time can be around 1 or 2 minutes.

In one embodiment, temperature $T_b$ is maintained in the temperature range above due to thermal insulation of the reactor or by radiant or conductive heating.

In a second embodiment, $T_b$ is maintained in the temperature range above by dielectric heating, preferably high frequency or microwaves.

In this second embodiment, advantageously, the total dielectric heating time $t_{g1}$ of step b) is at least 7 minutes. The total heating time starts at the beginning of the period of temperature increase and ends at the end of the time of maintaining the complete jellification setpoint temperature. In other words, it comprises the temperature increase time and time $t_1$. It is observed experimentally that this time $t_{g1}$ is advantageously less than or equal to 1 hour, still more advantageously less than or equal to 30 minutes, still more advantageously less than or equal to 15 minutes, still more advantageously less than or equal to 12 minutes.

Step c)

Preferably, when the drying of step d) is done under subcritical conditions, hydrophobization step c) is not optional.

Advantageously, when the aerogel is organic, step c) is not implemented.

Step c) is implemented at a hydrophobization setpoint temperature $T_c$ comprised in a range from 60° C. to 200° C., temperature $T_c$ being maintained in this range for a sufficient time $t_2$ to obtain hydrophobization of the lyogel.

The time $t_2$ sufficient to obtain hydrophobization of the lyogel in step c) is determined according to criteria well-known to the skilled person. For example, this time can be measured by determining the amount of elemental carbon by elemental analysis. Depending on the nature of the hydrophobing agent, the structure of the hydrophobic groups grafted on the lyogel can be deduced. By determining the difference between the elemental carbon content of the hydrophobic lyogel and the lyogel obtained directly at the end of step b) (non-hydrophobic), it is possible to deduce the concentration of grafted groups. For example, in the case of a silica alcogel undergoing hydrophobing treatment with hexamethyldisiloxane, the maximal concentration of Si—(CH$_3$)$_3$ grafts is 60% relative to the number of silanols Si—OH. In practice, the process is pursued (that is, one proceeds to step d)) until the final aerogel is obtained, and the thermal properties of the aerogel obtained are measured. If these are satisfactory, (for example, thermal conductivity λ of the final aerogel is less than 25 mW/m.K, preferably less than 21 mW/m.K, and in the case of a monolithic composite aerogel comprised between 10 and 15 mW/m.K, time $t_2$ is sufficient. If they are not (for example thermal conductivity greater than 25 mW/m.K, preferably greater than 21 mW/m.K, and in the case of monolithic composite aerogels 15 mW/m.K), time $t_2$ is insufficient.

Moreover, the apparent density of the aerogel obtained can also be measured. If this is satisfactory (for example apparent density less than or equal to 150 kg/m$^3$, in particular between 40 and 150 kg/m³; in the case of aerogels obtained as monolithic aerogels, the aerogel preferably has an apparent density between 70 and 150 kg/m³; in the case of aerogels obtained as granules, the aerogel preferably has an apparent density between 40 and 90 kg/m³), $t_2$ is sufficient. If they are not (for example, apparent density greater than or equal to 150 kg/m³ in the case of a monolithic aerogel; or greater than or equal to 90 kg/m³ in the case of a granular aerogel), time $t_2$ is insufficient.

The mechanical properties of the aerogel obtained can also be measured. If they are satisfactory (for example the Young's modulus of the aerogel is comprised between 0.6 and 2 MPa), time $t_2$ is sufficient. If they are not (for example Young's modulus below 0.6 MPa), time $t_2$ is insufficient.

In one particular embodiment, temperature $T_c$ is identical to temperature $T_b$.

Preferably, temperature $T_c$ is greater than the boiling point of the solvent. Advantageously, the absolute pressure in the reactor at step c) is greater than atmospheric pressure. Preferably, step c) is therefore done under pressure. For example, the absolute pressure in the reaction medium of step c) is comprised between 1 and 20 bars, more preferably, it is comprised between 1 and 15 bars, and even more preferably it is comprised between 1.5 and 12 bars.

Advantageously, the hydrophobization reagents (in particular the hydrophobing agent) are introduced at a pressure comprised between atmospheric pressure and a pressure representing 150% of the pressure within the reactor in which step c) is implemented. Advantageously, the hydrophobization reagents are introduced at a pressure comprised between 120% and 150% of the pressure within the reactor in which step c) is implemented.

In one advantageous embodiment, steps b) and c) are implemented in the same reactor.

In another advantageous embodiment, steps a), b) and c) are implemented in the same reactor.

Advantageously, the hydrophobization reagents (in particular the hydrophobing agent) are introduced at a temperature comprised between 20° C. and their boiling point. For example, when the hydrophobing agent is HDMSO, the hydrophobization reagents (in particular the hydrophobing agent) are introduced at a temperature comprised between 20° C. and 150° C. In one particular embodiment, the hydrophobization reagents are introduced at room temperature.

In one particular case, hydrophobization step c) can involve a heating or cooling phase in order to reach a hydrophobization setpoint temperature in a range going from 60° C. to 200° C.

However, generally, during the introduction of hydrophobization reagents, especially when they are introduced at room temperature, a slight drop in temperature of the lyogel is observed. In this case, it is preferable to conduct a heating to reach temperature $T_c$.

Thus, in this embodiment, hydrophobization step c) involves heating to reach a hydrophobization setpoint temperature $T_c$ in a range from 60° C. to 200° C., temperature Tc being maintained in this range for a sufficient time $t_2$ to obtain hydrophobization of the lyogel.

The heating time to reach temperature $T_c$ depends on the quantity of lyogel in the reactor, its initial temperature (i.e., temperature $T_b$), the temperature and the quantity of hydrophobization reagents introduced and the power density applied to the reaction mixture comprising the lyogel and hydrophobization reagents. Preferably, this time is as short as possible, and if possible less than the time sufficient to obtain hydrophobization of the sol in step c). For example, this heating time can be around 1 minute.

In the case where temperature $T_b$ is equal to temperature $T_c$, the heating time is such that it is sufficient to compensate for cooling due to the introduction of the hydrophobization reagents. For example, this heating time can be around 1 minute.

In a first embodiment, the heating of step c) is implemented by radiant or conductive heating. In this case, the preferred temperature range is comprised between 70° C. and 150° C., more preferably between 70° C. and 120° C., and most preferably between 70° C. and 110° C.

Preferably, in this first embodiment, time $t_2$ is at least 1 hour. It is observed experimentally that this time $t_2$ is advantageously less than or equal to 6 hours, advantageously less than or equal to 4 hours, still more advantageously less than or equal to 2 hours. Time $t_2$ is chosen, in particular, according to the temperature at which step c) is conducted.

In a second embodiment, the heating of step c) is implemented by dielectric heating. The dielectric heating of step c) can be applied either by microwave irradiation or by high-frequency irradiation. Advantageously the frequency range of the electromagnetic field applied is comprised between 3 MHz and 3000 MHz, still more advantageously between 3 MHz and 2500 MHz. In the case of microwave irradiation, the frequency range of the electromagnetic field applied is advantageously comprised between 400 and 2500 MHz. In the case of high-frequency irradiation, the frequency range of the electromagnetic field applied is advantageously comprised between 10 and 400 MHz. Preferably, in this second embodiment, time $t_2$ is at least 6 minutes. It is observed experimentally that this time $t_2$ is advantageously less than or equal to 1 hour, advantageously less than or equal to 30 minutes, still more advantageously less than or equal to 15 minutes, still more advantageously less than or equal to 10 minutes.

In this second embodiment, the hydrophobization setpoint temperature of step c) is advantageously kept in the temperature range above by dielectric heating, preferably high frequency or microwave. Advantageously, the total dielectric heating time $t_{g2}$ of step c) is at least 7 minutes. Total time $t_{g2}$ comprises time $t_{g2}$ and possibly the temperature increase time. It is observed experimentally that this time $t_{g2}$ is advantageously less than or equal to 1 hour, advantageously less than or equal to 30 minutes, still more advantageously less than or equal to 15 minutes, still more advantageously less than or equal to 12 minutes.

In the case where the lyogel is an alcogel, step b) is advantageously followed by a step c) of hydrophobization treatment of the alcogel, at the end of which a hydrophobic alcogel is obtained. Step c) comprises, for example, contacting the alcogel obtained in step b) with a hydrophobing agent in acid medium of pH comprised between 1 and 3. Advantageously, the hydrophobing agent used is selected from the group consisting of organosiloxanes, organochlorosilanes and organoalkoxysilanes, more advantageously, the hydrophobing agent used is selected from the group consisting of hexamethyldisiloxane (HMDSO), trimethylchlorosi lane, trimethylethoxysilane hexamethyldisilazane and, even more advantageously hexamethyldisiloxane (HMDSO). Moreover, in this embodiment, the sol is advantageously a silica sol, preferably obtained by controlled hydrolysis of tetraethoxysilane in ethanol.

Advantageously, the alcogel is acidified during step c) by addition of a mineral or organic acid. More advantageously, the mineral acid is hydrochloric acid and the organic acid is trifluoroacetic acid. Still more advantageously, the acid is trifluoroacetic acid or hydrochloric acid and the hydrophobing agent is hexamethyldisiloxane (HMDSO).

If the hydrophobing agent is hexamethyldisilazane, it is advantageously added alone or with a solvent like ethanol.

Advantageously, in this embodiment, step c) is conducted at a temperature comprised between 50° C. and 150° C. Still more advantageously, step c) is conducted at a temperature greater than or equal to the boiling point of the alcohol (alcogel solvent). If the solvent is ethanol, step c) is conducted at a temperature advantageously comprised between 100° C. and 150° C., preferably between 110° C. and 130° C.

In the case where the lyogel is a hydrogel, a step b1) for exchanging the solvent (water) for an organic solvent like acetone, hexane or heptane leading to the formation of a lyogel is advantageously performed between steps b) and c). The conditions for implementing step c) of hydrophobization treatment of the lyogel are similar to those described previously in the case where the lyogel is an alcogel (notably temperature, reagents, etc.), except for the solvent.

In these two embodiments, the hydrophobing treatment at step c) of the process notably aims at reducing the water uptake of the composite material.

Drying: Step d)

Drying step d) is preferably performed so that the aerogel obtained has a residual quantity of solvent at a weight less than or equal to 3% (by weight), preferably 1% (by weight, according to standard EN/ISO 3251. The protocol used consists of taking 1 g of aerogel according to the invention, weighing it, then drying it for 3 h in an oven at 105° C., then weighing the aerogel thus dried. The ratio of the difference between these two weights over the weight of the aerogel obtained after drying allows determining the residual quantity of solvent in weight %.

In one particular embodiment, drying step d) is implemented under supercritical conditions.

In another particular embodiment, drying step d) is implemented under subcritical conditions, for example by radiant, conductive, convective or dielectric drying.

When drying step d) is a convective drying, it is preferably performed at a temperature comprised between 120° C. and 180° C., preferably comprised between 140° C. and 160° C., still more preferably equal to 150° C. Convective drying can be conducted in natural mode, but is preferably conducted in forced mode.

When step d) is a dielectric drying step, it is advantageously by microwave or high frequency. Preferably, the power density provided during drying step d) by microwaves is comprised between 0.3 kW and 3 kW per kg of initial lyogel optionally made hydrophobic, preferably comprised between 0.5 kW and 2 kW per kg of initial lyogel, still more preferably equal to 1 kW per kg of initial lyogel. Said power density is adjusted during drying so that the temperature of the material is comprised between 40° C. and 400° C., more preferably between 40° C. and 200° C., still more preferably between 50° C. and 150° C.

In one preferred embodiment of the invention, when step d) is a dielectric drying step, it is performed in the same reactor as the reactor implemented in steps b) and c), after having adapted a system to distill the solvent that is evaporated during drying.

In one preferred embodiment, step d) is preceded by a step d1) of pre-drying under subcritical conditions at a temperature below 80° C.

Advantageously, the pre-drying temperature of step d1) is comprised between 40° C. and 80° C., still more advantageously comprised between 60° C. and 80° C., still more advantageously is equal to 80° C.

Preferably, pre-drying step d1) is continued until a condensed lyogel is obtained having lost between 10 and 80% of solvent by weight, advantageously between 20% and 60% of solvent by weight, still more preferably between 40% and 50% of solvent by weight relative to the weight of the initial lyogel. The solvent mass lost during step d) or d1) is measured differently depending on the scale of the process. At the laboratory scale, this quantity is measured by the difference between the weight of the lyogel and that of the aerogel obtained after step b) or c) (when this is done) after drying under the conditions of step d) or d1). At the industrial scale, the solvent evaporated during drying step d) or d1) is condensed into another reactor and then weighed.

In a preferred embodiment of the invention, step d1) is done by circulation of a hot gas flow in the reactor. The gas flow is typically an inert gas flow such as nitrogen, air, or a rare gas. Advantageously, the hot gas flow circulates vertically, still more preferably from top to bottom.

In another embodiment, the pre-drying at step d1) is conducted under reduced pressure. Such an embodiment is advantageous since it permits obtaining shorter pre-drying times at the same temperature.

Dielectric Heating

Preferably, the electromagnetic field applied for dielectric heating (preferably by microwave or high-frequency irradiation) during step b), c) or d) is homogenous in the lyogel.

Advantageously, the frequency of the electromagnetic field applied at step b), and possibly at step c) and/or d), will be chosen in a range from 3 MHz to 3000 MHz.

The geometry of the reactor is advantageously chosen by the skilled person so that the density of the electromagnetic field applied for dielectric heating (preferably by microwave or high-frequency irradiation) during step b), c) or d) is homogenous in the sol or lyogel. This geometry is notably adapted according to criteria well-known to the skilled person depending on the depth of penetration ($d_p$) of the electromagnetic field, which is a function of the frequency of the electromagnetic field applied, as the formula below reports:

$$d_p = c/(2\sqrt{(2)} * \pi f \sqrt{\{\varepsilon'_r [\sqrt{(1+(\varepsilon''_r/\varepsilon'_r)^2)} - 1]\}})$$

in which:

$d_p$ represents the penetration depth (in meters) where the microwave power reaches ⅓ (one-third) of the power applied on the surface;

c represents the speed of light (in m/s$^{-1}$)

f represents the frequency of the electromagnetic field applied (Hz)

$\varepsilon'_r$ represents relative permittivity (dimensionless)

$\varepsilon''_r$ represents dielectric loss (dimensionless).

The values of $\varepsilon'_r$ and $\varepsilon''_r$ are known to the skilled person. Notably, $\varepsilon'_r$ equals 34 for ethanol and 78 for water. Furthermore, $\varepsilon''_r$ is comprised between 0.1 and 5 for the reactants according to the invention, notably silica sols and alcogels optionally made hydrophobic.

The power density provided by the generator is adapted according to the reactant volume (sol, solvent, lyogel, hydrophobization reagents) and their intrinsic characteristics such as, notably, their dielectric constant. To alleviate any inhomogeneities of the electromagnetic field, sweeping with a wave stirrer or by moving the reaction chamber in the field may be implemented.

Aerogels Obtained by the Process

The aerogels obtained by the process according to the invention are present in the form of granules or monolithic aerogels.

Advantageously, the aerogels thus obtained have a thermal conductivity λ less than or equal to 25 mW/m.K, still more advantageously less than or equal to 21 mW/m.K, measured according to the guarded hot plate method of standard NF EN 12667 at 20° C. and at atmospheric pressure.

In the case of aerogels obtained in the form of granules, the aerogel preferably has a thermal conductivity λ less than or equal to 21 mW/m.K, advantageously comprised between 10 and 21 mW/m.K, measured according to the guarded hot plate method of standard NF EN 12667 at 20° C. and at atmospheric pressure.

In the case of aerogels obtained in the form of monolithic aerogels, the aerogel preferably has a thermal conductivity λ less than or equal to 20 mW/m.K, advantageously comprised between 10 and 15 mW/m.K, measured according to the guarded hot plate method of standard NF EN 12667 at 20° C. and at atmospheric pressure.

Moreover, the aerogels obtained by the process according to the present invention advantageously have an apparent density less than or equal to 150 kg/m$^3$, for example the apparent density is comprised between 40 and 150 kg/m$^3$. In the case of aerogels obtained as monolithic aerogels, the aerogel preferably has an apparent density between 70 and 150 kg/m$^3$, for example between 100 and 150 kg/m$^3$. In the case of aerogels obtained as granules, the aerogel preferably has an apparent density between 40 and 90 kg/m$^3$.

Advantageously, the aerogel according to the invention does not comprise binder. Examples of inorganic binder include cements, plasters, gypsum, lime, and examples of organic binders include thermoplastics such as polyolefin waxes, styrene polymers or polyamides. The term binder also comprises adhesives, such as epoxy resins, cyanoacrylates for example.

The aerogels obtained according to the process of the present invention are inorganic, organic or hybrid.

In one embodiment, the aerogel is an inorganic aerogel, in particular chosen from the group of silica, titanium oxide, manganese oxide, calcium oxide, calcium carbonate, zirconium oxide, polyurethane/cellulose aerogels or mixtures thereof, preferably from the group of silica, titanium oxide, manganese oxide, calcium oxide, calcium carbonate aerogels or mixtures thereof, more preferably it is a silica aerogel, preferably hydrophobic.

In another embodiment, the aerogel is an organic aerogel, in particular chosen from the group of aerogels of resorcinol formaldehyde, phenol formaldehyde, melamine formaldehyde, cresol formaldehyde, furfuryl alcohol phenol, polyacrylamides, polyacrylonitriles, polyacrylates, polycyanurates, polyfurfural alcohol, polyim ides, polystyrenes, polyurethanes, polyvinyl alcohol dialdehyde, epoxy, agar, and agarose (for a synthesis see by traditional method, see in particular C. S. Ashley, C. J. Brinker and D. M. Smith, *Journal of Non-Crystalline Solids*, Volume 285, 2001).

Hybrid aerogels advantageously comprise a mixture of organic and inorganic aerogels, preferably such as those named above.

Aerogels obtained by the process of the invention preferably have a water uptake rate according to standard NF EN ISO 12571 at room temperature and 70% relative humidity less than or equal to 5%, even more preferably less than or equal to 3% and preferably a water uptake rate at room temperature and 95% relative humidity less than or equal to 10%, even more preferably less than or equal to 5%.

Advantageously, the aerogel according to the invention is hydrophobic, vapor permeable and maintains a temperature up to 250° C. The materials according to the invention have good fire resistance properties, they are preferably classified at least B1 according to German standard DIN 4102-1, M1 in France according to standard NF P-92507, or V0 according to the US UL94. The combustion energy or gross calorific value of the composite material according to the invention measured according to standard NF EN ISO 1716 is advantageously lower than most high-performance insulation materials, such as polyurethane. It also has good acoustic insulation properties, especially comparable to rock wool.

Composite aerogels (i.e., comprising a reinforcement material) obtained according to the present invention combine the mechanical properties of fibers and the insulating properties of aerogels.

In one particular embodiment, the aerogel comprises a fibrous reinforcement material comprising a fibrous nonwoven web, advantageously chosen from among organic webs, inorganic webs, natural fiber webs, mixed webs and laminated mixed webs. Advantageously, the organic web is chosen from among organic polyethylene terephthalate webs (PET). Advantageously, the inorganic web is chosen from among inorganic glass wool or rock wool webs. Advantageously, the natural fiber web is chosen from among natural fiber lamb's wool or flax fiber webs. Advantageously, the fibrous nonwoven web has a thickness comprised between 30 and 70 mm and an open porosity comprised between 96% and 99.8%.

The monolithic aerogels thus obtained advantageously have a thickness comprised between 30 mm and 70 mm, still more advantageously between 30 mm and 60 mm, still more advantageously between 40 mm and 45 mm.

Advantageously, in this first embodiment, the monolithic aerogel comprises between 50% and 90% by weight of aerogel relative to the weight of the panel, preferably between 60% and 80% by weight of aerogel relative to the weight of the panel.

In a second embodiment, the composite aerogel comprises a foam as the reinforcement material. Such a foam improves certain mechanical properties of the aerogel while preserving thermal conductivity less than 20 mW/m.K measured according to the guarded hot plate method of standard NF EN 12667 at 20° C. and at atmospheric pressure. For example, the maximum stress in elastic phase of the composite materials is much greater than that of the corresponding unreinforced aerogel. Typical values are, respectively, 3.5 MPa (for the composite material) and $1.10^{-4}$ MPa (for the corresponding unreinforced aerogel).

In this second embodiment, the monolithic aerogel according to the invention comprises between 85% and 98% by weight of aerogel relative to the weight of the composite material, preferably between 90% and 95% or between 90 and 98% by weight of aerogel relative to the weight of the composite material.

In this embodiment, the monolithic aerogel according to the invention advantageously has a thickness comprised between 2 and 50 mm, preferably between 5 and 30 mm, for example between 10 and 20 mm. It is observed that the thickness of the monolithic material is correlated with the thickness of the foam used. Thus, the foam of the present invention advantageously has a thickness comprised between 2 and 50 mm, preferably between 5 and 30 mm, for example between 10 and 20 mm.

Uses

Aerogels obtained by the process according to the present invention can be used as thermal insulation, especially for building construction or insulation of industrial systems or processes. Thus, the aerogels obtained by the process according to the present invention are advantageously used for the production of construction materials, especially walls and partitions, as well as floors or ceilings or insulation of industrial piping.

The aerogels obtained by the process according to the present invention can also be used as acoustic insulation.

The monolithic aerogels obtained by the process according to the present invention can be used, in particular, to form multilayer panels, more particularly in the form of laminated or sandwich multilayer panels, comprising at least one layer essentially consisting of a monolithic composition material according to the invention, possibly in combination with layers of a different type. In said multilayer panels, each layer is made up of a monolithic material or a panel affixed to one or more other layers.

For example, one or more plasterboards (possibly of type BA13) can be affixed to one or both sides of a monolithic composite material according to the invention to form a lining system. Mixed multilayer panels are also envisaged, comprising a combination of one or more composite materials according to the invention and a composite material such as described, for example, in international application WO 2013/053951.

The multilayer panels thus obtained also find applications as thermal insulation, especially for applications in building construction or insulation for industrial systems or processes.

The monolithic aerogels obtained by the process according to the present invention can be used, in particular, as mechanical shock absorbers.

The examples that follow are intended to illustrate the invention in more detail, but are in no case limiting.

EXAMPLES

Example 1

Preparation of a Silica Sol

A silica sol having the following composition: 36.2% polyethoxydisiloxane in 20% solution in ethanol, is obtained by partial hydrolysis of tetraethoxysilane (TEOS) in the presence of hydrochloric acid, 54.3% ethanol, 8.9% deionized water and 0.6% ammonia.

Example 2

Preparation of an Aerogel According to the Invention, with Heating by Microwave Irradiation in Step c)

2 L of the silica sol of Example 1 were poured before jellification into a closed chamber (step a). The reactor is then heated by application of a microwave field until a temperature of around 120° C. is reached (complete jellification setpoint temperature) in the reactant mass (step b). The pressure inside the reactor is then 5 bars absolute. The complete jellification setpoint temperature is 120° C. The time for step b) ($t_{g1}$) is 7.5 minutes.

Then, hydrochloric acid (until a pH=1 is reached) and hexamethyldisiloxane (hydrophobing agent) are introduced at ambient temperature and pressure in the reactor so as to completely cover the alcogel (step c). A slight drop in temperature is observed. The reaction medium is heated by application of a microwave field to reach a temperature of around 120° C. again (hydrophobization setpoint temperature). The duration of step c) is 7.5 minutes ($t_{g2}$). Then the microwaves are stopped and the reaction medium is separated from the hydrophobic silica alcogel by percolation.

Figure 1:
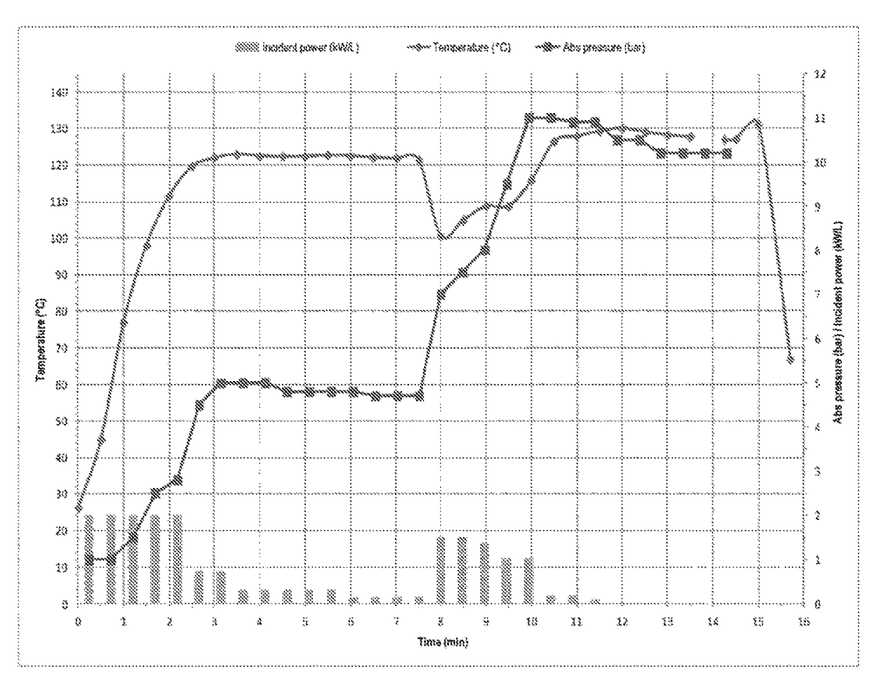
FIG. 1; representation of the change in temperature, absolute pressure and applied power density by microwave irradiation as a function of time under the reaction conditions of Example 2.

FIG. 1 represents the change in temperature, absolute pressure and applied power density by microwave irradiation as a function of time in the reactant mass.

The overall reaction time (steps a), b) and c)) is therefore around 15 minutes.

The alcogel is then dried in a ventilated oven at 160° C. for 2 hours (step d). The aerogel obtained in the form of granules has an apparent density of 85 kg/m³ and a thermal conductivity of 24 mW/m.K, measured according to the guarded hot plate method of standard NF EN 12667 at 20° C. and atmospheric pressure.

Example 3

Preparation of a Monolithic Aerogel According to the Invention, with Heating by Microwave Irradiation in Step c)

2 L of the silica sol of Example 1 were poured before jellification over a melamine foam web of 50×20×10 mm³ in a closed chamber (step a).

The reactor is then heated by application of a microwave field until a temperature of around 120° C. is reached (complete jellification setpoint temperature) in the reactant mass (step b). The pressure inside the reactor is then 5 bars absolute. The complete jellification setpoint temperature is 120° C. The duration of step b) is 1 hour ($t_{g1}$).

Then, hydrochloric acid (until a pH=1) and hexamethyldisiloxane (hydrophobing agent) are introduced at ambient temperature and pressure in the reactor so as to completely cover the alcogel (step c). A slight drop in temperature is observed. The reaction medium is heated by application of a microwave field to reach a temperature of around 120° C. again (hydrophobization setpoint temperature). The duration of step c) is 1 hour ($t_{g2}$). Then the microwaves are stopped and the reaction medium is separated from the hydrophobic silica alcogel by percolation.

The overall reaction time (steps a), b) and c)) is therefore around 2 hours.

The alcogel is then dried in a ventilated oven at 160° C. for 2 hours (step d). The aerogel obtained in the form of monolithic composite aerogel has an apparent density of 120 kg/m3 and a thermal conductivity of 13.5 mW/m.K, measured according to the guarded hot plate method of standard NF EN 12667 at 20° C. and atmospheric pressure.

Example 4

Other Examples According to the Invention

The protocol used for these tests is as follows:
50 g of the silica sol of Example 1 were poured before jellification into a closed chamber (step a). The reactor is then heated by application of a microwave field until a temperature of around 120° C. is reached in the reactant mass (step b). The pressure inside the reactor is then 5 bars absolute. The complete jellification setpoint temperature is indicated in the table. The time for step b) is $t_{g1}$ minutes.

Then, hydrochloric acid (until pH=1) and hexamethyldisiloxane (hydrophobing agent) are introduced into the reactor so as to completely cover the alcogel (step c). A slight drop in temperature is observed (step c). The reaction medium is heated by application of a microwave field to reach the setpoint temperature indicated in the table below again. The time for step c) is $t_{g2}$ minutes.

The hydrophobization setpoint temperature is in this case identical to the complete jellification setpoint temperature.

Then the microwaves are stopped and the reaction medium is separated from the hydrophobic silica alcogel by percolation.

The alcogel is then dried in a ventilated oven at 160° C. for 2 hours (step d).

The aerogel obtained in the form of granules has an apparent density (in kg/m³) presented in the table below.

| Setpoint temperature ($T_b$ and $T_c$)(° C.) | time $t_{g1}$ (min) | time $t_{g2}$ (min) | Apparent density (kg/m3) |
|---|---|---|---|
| 85 | 6 | 6 | 180 |
| 100 | 8 | 8 | 85 |
| 120 | 8 | 8 | 60 |
| 120 | 18 | 18 | 50 |
| 120 | 33 | 33 | 50 |
| 150 | 31 | 31 | 45 |

In this example, it is observed that, when the temperature is less than 100° C., and in a short time ($t_{g1}$=6 minutes), the apparent density of the aerogel obtained is greater than 150 kg/m³. In this case, the performance of the aerogel obtained will be insufficient, both in terms of thermal insulation and mechanical performance.

Comparative Example 5

2 L of the silica sol of Example 1 were poured before jellification into a closed chamber (step a). The reactor is then heated by application of a microwave field until a temperature of around 120° C. is reached (complete jellification setpoint temperature) in the reactant mass (step b). The pressure inside the reactor is then 5 bars absolute. The complete jellification setpoint temperature is around 120° C. The duration of step b) is 6 minutes (tg1).

Then, hydrochloric acid (until pH=1) and hexamethyldisiloxane (hydrophobing agent) are introduced into the reactor so as to completely cover the alcogel. A slight drop in temperature is observed (step c). The reaction medium is heated by application of a microwave field to reach a temperature of around 120° C. again (hydrophobization setpoint temperature). The duration of step c) is 9 minutes ($t_{g2}$). Then the microwaves are stopped and the reaction medium is separated from the hydrophobic silica alcogel by percolation.

The overall reaction time (steps a), b) and c)) is therefore 15 minutes, like in Example 1, but with a time $t_{g1}$ of 6 minutes instead of 7.5 minutes.

The alcogel is then dried in a ventilated oven at 160° C. for 2 hours (step d). The aerogel obtained in the form of granules has an apparent density of 140 kg/m³ and a thermal conductivity of 32 mW/m.K, measured according to the guarded hot plate method of standard NF EN 12667 at 20° C. and atmospheric pressure.

In this case, the time $t_{g1}$, and consequently $t_1$, was insufficient for the aerogel to have thermal conductivity less than or equal to 25 mW/m.K.

Example 6

Preparation of an Aerogel According to the Invention, with Convective Heating in Step c)

2 L of the silica sol of Example 1 were poured before jellification into a closed chamber (step a). The reactor is then heated by application of a microwave field until a temperature of around 120° C. is reached (complete jellification setpoint temperature) in the reactant mass (step b). The pressure inside the reactor is then 5 bars absolute. The complete jellification setpoint temperature is around 120° C. and the time for step b) is 7.5 minutes ($t_{g1}$).

Then, hydrochloric acid (until pH=1) and hexamethyldisiloxane (hydrophobing agent) are introduced into the reactor so as to completely cover the alcogel. A slight drop in temperature is observed. The reaction medium is then heated by convective heating to 70° C. in an oven for 12 hours (step c). Then the reaction medium is separated from the hydrophobic silica alcogel by percolation.

The alcogel is then dried in a ventilated oven at 160° C. for 2 hours (step d). The aerogel obtained in the form of granules has an apparent density of 63 kg/m³ and a thermal conductivity of 19.5 mW/m.K, measured according to the guarded hot plate method of standard NF EN 12667 at 20° C. and atmospheric pressure.

Comparative Example 7

100 mL of the silica sol of Example 1 were poured before jellification into a closed chamber (step a). The autoclave is then heated in an oven at a temperature of 120° C. (step b) for 30 minutes ($t_{g1}$).

Then the autoclave is cooled for 15 minutes. Then the chamber is opened, and hydrochloric acid (until pH=1) and hexamethyldisiloxane (hydrophobing agent) are introduced into the reactor so as to completely cover the alcogel. The autoclave is then heated in an oven at a temperature of 120° C. (step c) for 120 minutes ($t_{g2}$). Then heating is stopped and the reaction medium is separated from the hydrophobic silica alcogel by percolation.

The alcogel is then dried in a ventilated oven at 160° C. for 2 hours (step d). The aerogel thus obtained has an apparent density of 237 kg/m³, which is close to the density of glass. Now, with such a density, the aerogel cannot have a thermal conductivity λ less than or equal to 25 mW/m.K (measured according to the guarded hot plate method of standard NF EN 12667 at 20° C. and atmospheric pressure).

Thus, time $t_{g1}$, and consequently $t_1$, was insufficient for the aerogel to have satisfactory performance, both in terms of thermal insulation and mechanical performance.

The invention claimed is:

1. Aerogel manufacturing process comprising the following successive steps:
   a) forming or pouring a sol into a reactor, optionally in the presence of a reinforcing material and/or an additive,
   b) complete jelling of the sol into a lyogel, said step b) of complete jellification comprising dielectric heating by microwave or by high-frequency electromagnetic irradiation inducing an increase in temperature to reach a complete jellification setpoint temperature $T_b$ in a range from 100° C. to 200° C., temperature $T_b$ being maintained in this range for a time $t_1$ sufficient to reach the end of complete jellification of the lyogel, and more particularly completion of syneresis of the lyogel, and the high-frequency electromagnetic irradiation has a frequency range of from 1 MHz to 400 MHz the complete jelling comprises both jellification and aging of the resulting gel;

c) optionally hydrophobing the lyogel leading to a hydrophobic lyogel; and d) drying the lyogel to obtain an aerogel wherein hydrophobization, if any, is performed during step c) by hydrophobing the lyogel.

2. The process of claim 1, wherein time $t_1$ is at least 6 minutes and less than or equal to 1 hour.

3. The process of claim 1, wherein temperature $T_b$ is comprised between 110° C. and 130° C.

4. The process of claim 1, wherein temperature $T_b$ is maintained in the targeted range by dielectric heating with high-frequency or microwave electromagnetic irradiation.

5. The process of claim 4, wherein total dielectric heating time $t_{g1}$ by high-frequency or microwave electromagnetic irradiation in step b) is at least 7 minutes and less than or equal to 1 hour.

6. The process of claim 1, wherein hydrophobization step c) involves heating to reach a hydrophobization setpoint temperature $T_c$ in a range from 60° C. to 200° C., temperature $T_c$ being maintained in this range for a sufficient time $t_2$ to obtain hydrophobization of the lyogel.

7. The process of claim 6, wherein the heating of step c) is implemented by dielectric heating with high-frequency or microwave electromagnetic irradiation.

8. The process of claim 7, wherein time $t_2$ is at least 6 minutes and less than or equal to 1 hour.

9. The process of claim 6, wherein temperature $T_c$ is identical to temperature $T_b$.

10. The process of claim 1, wherein the high-frequency or microwave electromagnetic field applied for dielectric heating in step b) and/or c) and/or d) is homogenous in the lyogel.

11. The process of claim 1, wherein the sol is an inorganic silica sol.

12. The process of claim 1, wherein the lyogel is an alcogel.

13. The process of claim 1, wherein the drying step d) is implemented under subcritical conditions.

14. The process of claim 1, wherein the aerogel obtained by the process has a thermal conductivity $\lambda$ less than or equal to 25 mW/m.K, measured according to the guarded hot plate method of standard NF EN 12667 at 20° C. and at atmospheric pressure.

15. The process of claim 1, wherein the aerogel obtained by the process has an apparent density less than or equal to 150 kg/m$^3$.

16. The process of claim 1, wherein $T_b$ is in the range from 100° C. to 150° C.

17. The process of claim 6, wherein $T_c$ is in the range from 70° C. and 150° C.

18. The process of claim 14, wherein the aerogel has a thermal conductivity $\lambda$ less than or equal to 21 mW/m.K measured according to the guarded hot plate method of standard NF EN 12667 at 20° C. and at atmospheric pressure.

19. The process of claim 13, wherein the drying step d) is conducted by thermal or dielectric drying.

* * * * *